United States Patent
Hong et al.

(10) Patent No.: US 10,315,401 B2
(45) Date of Patent: Jun. 11, 2019

(54) TRANSFERRING METHOD OF GRAPHENE USING SELF-ADHESIVE FILM

(71) Applicants: SEOUL NATIONAL UNIVERSITY R&DB FOUNDATION, Gwanak-Gu (KR); GRAPHENE SQUARE INC., Gangnam-gu (KR)

(72) Inventors: Byung Hee Hong, Seoul (KR); Sang Jin Kim, Seoul (KR); Myung Jin Park, Seoul (KR); In Su Jo, Seoul (KR)

(73) Assignees: Seoul National University R&DB Foundation, Seoul (KR); Graphene Square Inc., Seoul (KR)

( * ) Notice: Subject to any disclaimer, the term of this patent is extended or adjusted under 35 U.S.C. 154(b) by 405 days.

(21) Appl. No.: 14/794,876

(22) Filed: Jul. 9, 2015

(65) Prior Publication Data
US 2015/0314579 A1   Nov. 5, 2015

Related U.S. Application Data

(63) Continuation of application No. PCT/KR2014/000365, filed on Jan. 13, 2014.

(30) Foreign Application Priority Data

Jan. 11, 2013  (KR) .................... 10-2013-0003571

(51) Int. Cl.
*B32B 37/00* (2006.01)
*B32B 37/18* (2006.01)
(Continued)

(52) U.S. Cl.
CPC .......... *B32B 37/025* (2013.01); *B32B 37/18* (2013.01); *B32B 37/24* (2013.01); *B32B 38/10* (2013.01); *C01B 32/194* (2017.08); *B32B 2255/06* (2013.01); *B32B 2264/105* (2013.01); *B32B 2307/202* (2013.01); *B32B 2307/412* (2013.01); *B32B 2307/704* (2013.01); *B32B 2309/027* (2013.01); *B32B 2310/0418* (2013.01); *B32B 2313/04* (2013.01); *B32B 2331/04* (2013.01)

(58) Field of Classification Search
CPC ................ B32B 37/24; B32B 2255/06; B32B 2264/105; B32B 2307/704; B32B 2309/027; B32B 2310/0418; B32B 2313/04; B32B 2331/04; B32B 37/025; B32B 37/18; B32B 38/10; B32B 2307/202; B32B 2307/412; C01B 32/194
See application file for complete search history.

(56) References Cited

U.S. PATENT DOCUMENTS

2011/0048625 A1    3/2011  Caldwell et al.
2012/0258311 A1*  10/2012  Hong .................... B82Y 30/00
                                                                  428/408
(Continued)

FOREIGN PATENT DOCUMENTS

KR    10-0890008 B1    3/2009
KR    20110031864 A    3/2011
(Continued)

*Primary Examiner* — Vishal I Patel
(74) *Attorney, Agent, or Firm* — Fox Rothschild LLP

(57) ABSTRACT

The present invention relates to a transferring method of graphene using a self-adhesive film.

15 Claims, 19 Drawing Sheets

(51) Int. Cl.
*B32B 38/10* (2006.01)
*B32B 37/24* (2006.01)
*C01B 32/194* (2017.01)

(56) References Cited

U.S. PATENT DOCUMENTS

2012/0270054 A1* 10/2012 Hong ..................... B29B 15/08
428/408
2012/0282419 A1* 11/2012 Ahn ....................... B82Y 30/00
428/34.8

FOREIGN PATENT DOCUMENTS

| KR | 20110042023 A | | 4/2011 | |
|----|---------------|---|--------|---|
| KR | 1020110042023 A | * | 4/2011 | |
| KR | 20110084110 A | | 7/2011 | |
| KR | 20110122524 A | | 11/2011 | |
| KR | 20110137564 A | | 12/2011 | |
| WO | WO-2010065346 A1 | * | 6/2010 | ............. B82Y 30/00 |

* cited by examiner

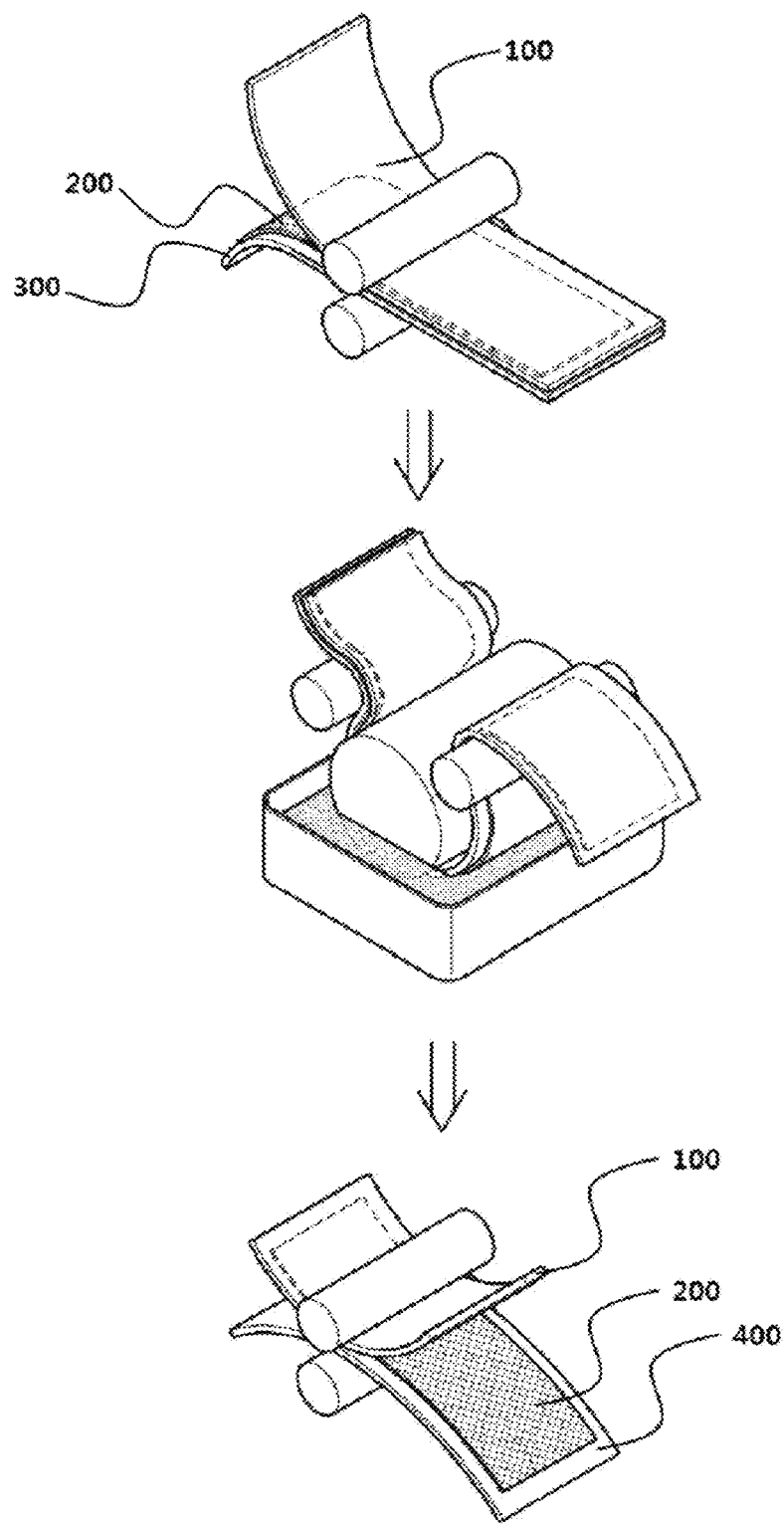

FIG. 2A
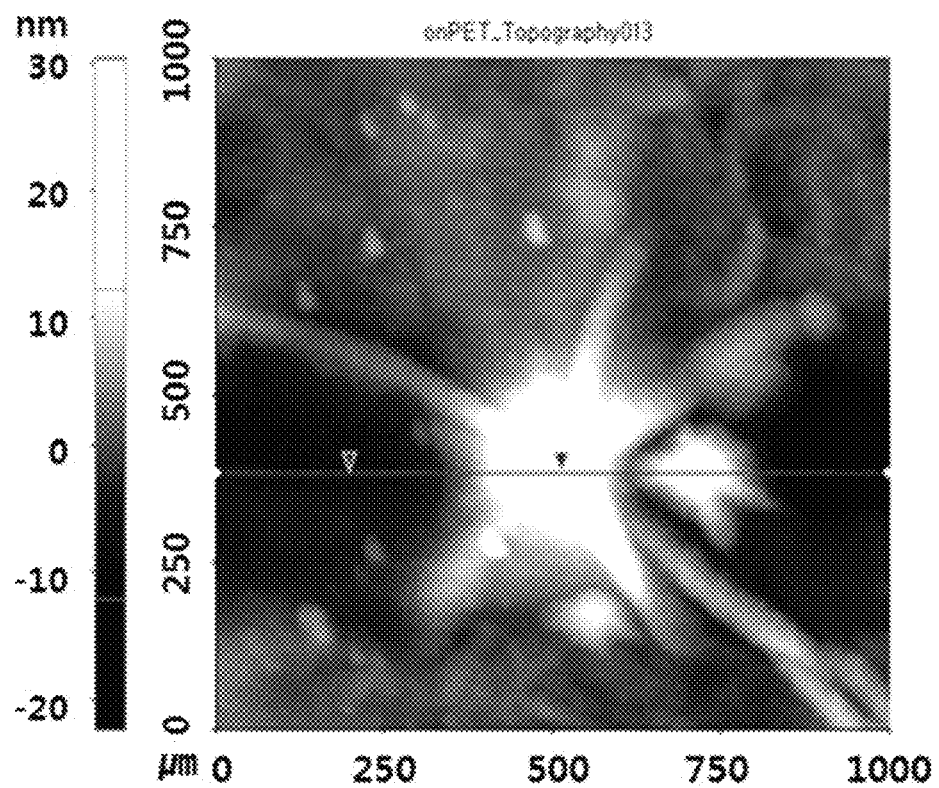
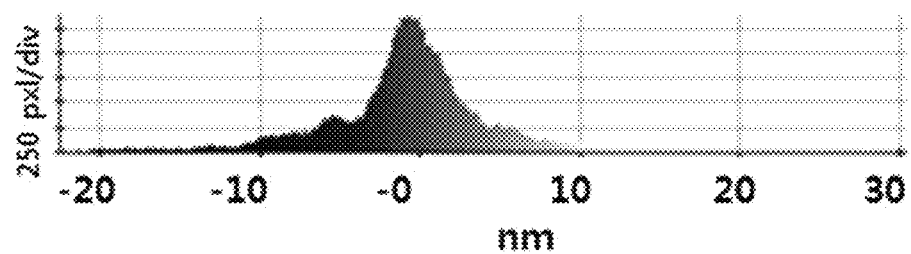

FIG. 2B

| Statistics | | | | | | | | | |
|---|---|---|---|---|---|---|---|---|---|
| Line | Min(nm) | Max(nm) | Mid(nm) | Mean(nm) | Rps(nm) | Rq(nm) | Ra(nm) | Rz(nm) | Rsk | Rku |
| Red | -21.235 | 29.213 | 3.989 | 0.000 | 50.448 | 14.201 | 12.461 | 23.493 | -0.362 | 1.977 |

*FIG. 3B*

| Statistics | | | | | | | | |
|---|---|---|---|---|---|---|---|---|
| Line | Min(nm) | Max(nm) | Mid(nm) | Mean(nm) | Rpv(nm) | Rq(nm) | Ra(nm) | Rz(nm) | Rsk | Rku |
| Red | -20.698 | 20.554 | -0.072 | 0.000 | 41.252 | 8.894 | 7.415 | 39.186 | 0.156 | 2.402 |

FIG. 4B

| Statistics | | | | | | | | | |
|---|---|---|---|---|---|---|---|---|---|
| Line | Min(nm) | Max(nm) | Mid(nm) | Mean(nm) | Rp(nm) | Rq(nm) | Ra(nm) | Rz(nm) | Rsk | Rku |
| Red | -23.935 | 106.846 | 41.455 | 0.000 | 130.781 | 27.816 | 18.323 | 72.926 | -2.250 | 7.470 |

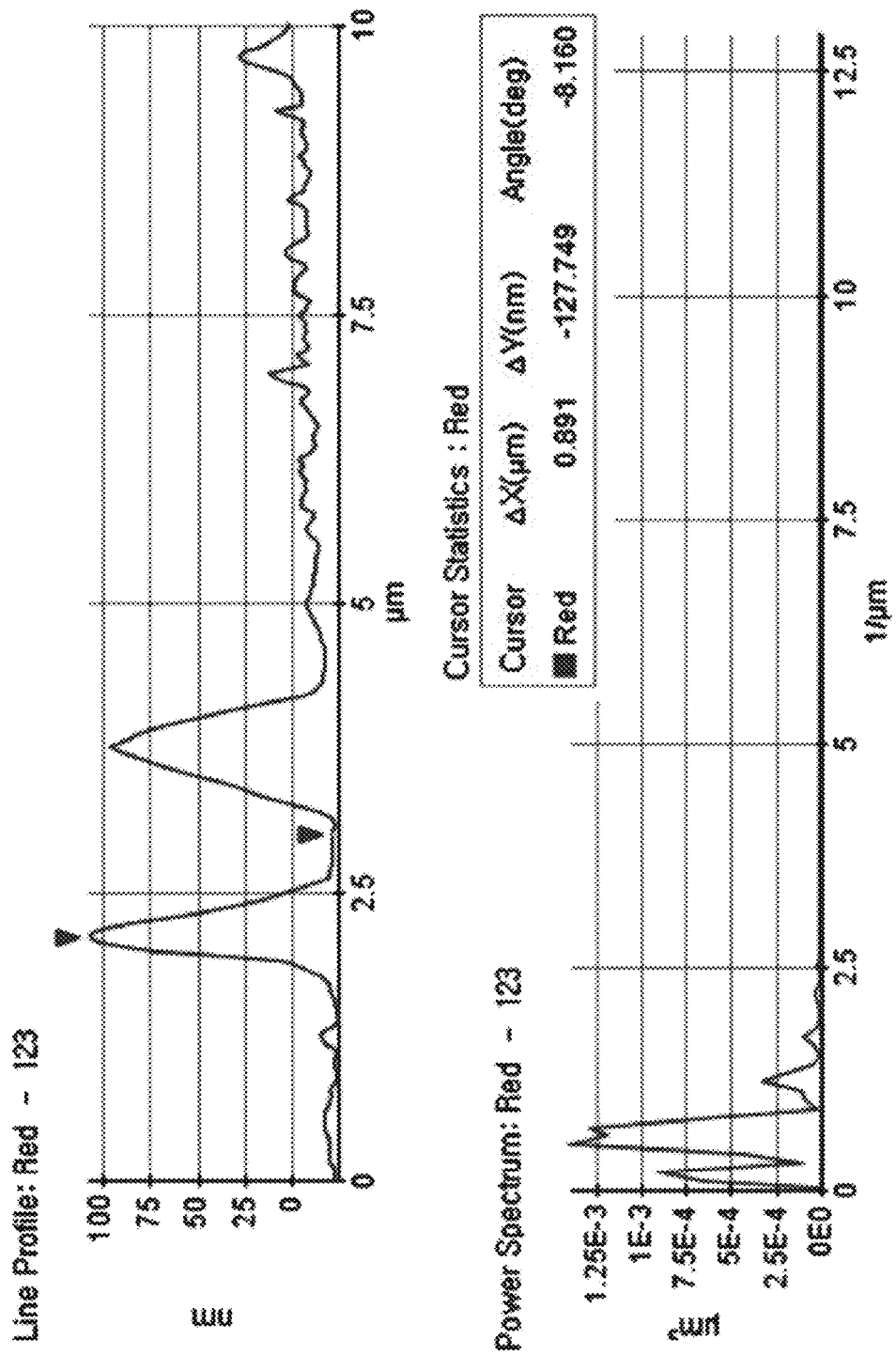

FIG. 5B

| Statistics | | | | | | | | | |
|---|---|---|---|---|---|---|---|---|---|
| Line | Min(μm) | Max(μm) | Mid(μm) | Mean(μm) | Rpk(μm) | Rq(μm) | Ra(μm) | Rz(μm) | Rsk | Rku |
| Red | -0.045 | 0.086 | 0.020 | 0.000 | 0.131 | 0.028 | 0.021 | 0.071 | -1.249 | 4.298 |

TRANSFERRING METHOD OF GRAPHENE USING SELF-ADHESIVE FILM

CROSS-REFERENCE TO RELATED APPLICATION

This application is a Continuation of International Patent Application No. PCT/KR2014/000365, filed Jan. 13, 2014, which claims priority to Korean Patent Application No. 10-2013-0003571, filed Jan. 11, 2013.

TECHNICAL FIELD

The present disclosure relates to a transferring method of graphene using a self-adhesive film.

BACKGROUND

Graphene is a material formed of hexagonally attached carbon atoms into a two-dimensional planar structure having a honeycomb shape, and it is very thin and transparent, and has high electrical conductivity. Many attempts have been made to apply graphene to a transparent display or a flexible display by using such properties of graphene. In recent years, many attempts have been actively made to synthesize large-area graphene.

Graphene can be prepared by chemically exfoliating a graphite or can be synthesized by a chemical vapor deposition method using a catalyst metal. Further, graphene can be formed or transferred onto a desired substrate and then used for various purposes. By way of example, as a method for transferring graphene synthesized on a surface of a catalyst metal by a chemical vapor deposition method onto a substrate, there has been mainly used a method in which a thermal-release tape is attached to the graphene, the catalyst metal is removed by etching, and then, heat is applied to the thermal-release tape, so that the graphene is transferred onto a substrate film.

However, in this transferring method of graphene, the graphene may be damaged by heat while the thermal-release tape is separated by heating. Further, while the graphene is attached to and separated from the thermal-release tape, the graphene may be mechanically damaged such as being crumpled or destroyed.

Therefore, various transferring methods of graphene have been studied in order to solve such problems. For example, Korean Patent Laid-open Publication No. 2011-0137564 discloses a transferring method of graphene using a hydrophilic oxide layer and water vapor. However, a method for easily transferring graphene or high-quality large-area graphene at low cost has not yet been developed.

DETAILED DESCRIPTION OF THE INVENTION

Problems to be Solved by the Invention

In view of the foregoing of the present disclosure is to provide a transferring method of graphene including transferring graphene by using a self-adhesive film. According to the transferring method of graphene of the present disclosure, it is possible to prevent or reduce thermal damage or physical damage of graphene which may be caused by a thermal-release tape during a transferring of the graphene.

However, problems to be solved by the present disclosure are not limited to the above-described problems. Although not described herein, other problems to be solved by the present disclosure can be clearly understood by those skilled in the art from the following descriptions.

Means for Solving the Problems

In a first aspect of the present disclosure, there is provided a transferring method of graphene, including attaching a self-adhesive film to one side of graphene on a first substrate; removing the self-adhesive film together with the graphene attached to the self-adhesive film from the first substrate; transferring the graphene attached to the self-adhesive film onto a second substrate; and removing the self-adhesive film from the graphene transferred onto the second substrate.

Effect of the Invention

According to a transferring method of graphene of the present disclosure, since it is not necessary to apply heat during a transferring of graphene, it is possible to maintain a quality of the graphene and also possible to economically and easily transfer the graphene as compared with using a thermal-release tape. Further, when a self-adhesive film is used, it is possible to prevent an adhesive from being transferred to a surface of the graphene, and unlike a disposable thermal-release tape, the self-adhesive film is economical since it can be reused after the graphene is transferred. Furthermore, since the graphene transferred by the transferring method of graphene of the present disclosure has excellent surface property and electrical property, it can be used to prepare various high-quality devices.

BRIEF DESCRIPTION OF THE DRAWINGS

FIG. 1 is a schematic diagram showing a transferring method of graphene in accordance with an embodiment of the present disclosure.

FIG. 2A, FIG. 2B and FIG. 2C show a result of analysis on a surface of graphene transferred by an example of the present disclosure by using an atomic force microscope (AFM).

FIG. 3A, FIG. 3B and FIG. 3C show a result of analysis on a surface of graphene transferred by an example of the present disclosure by using an atomic force microscope (AFM).

FIG. 4A, FIG. 4B and FIG. 4C show a result of analysis on a surface of graphene transferred by an example of the present disclosure by using an atomic force microscope (AFM).

FIG. 5A, FIG. 5B and FIG. 5C show a result of analysis on a surface of graphene transferred by an example of the present disclosure by using an atomic force microscope (AFM).

BEST MODE FOR CARRYING OUT THE INVENTION

Figure 2C:
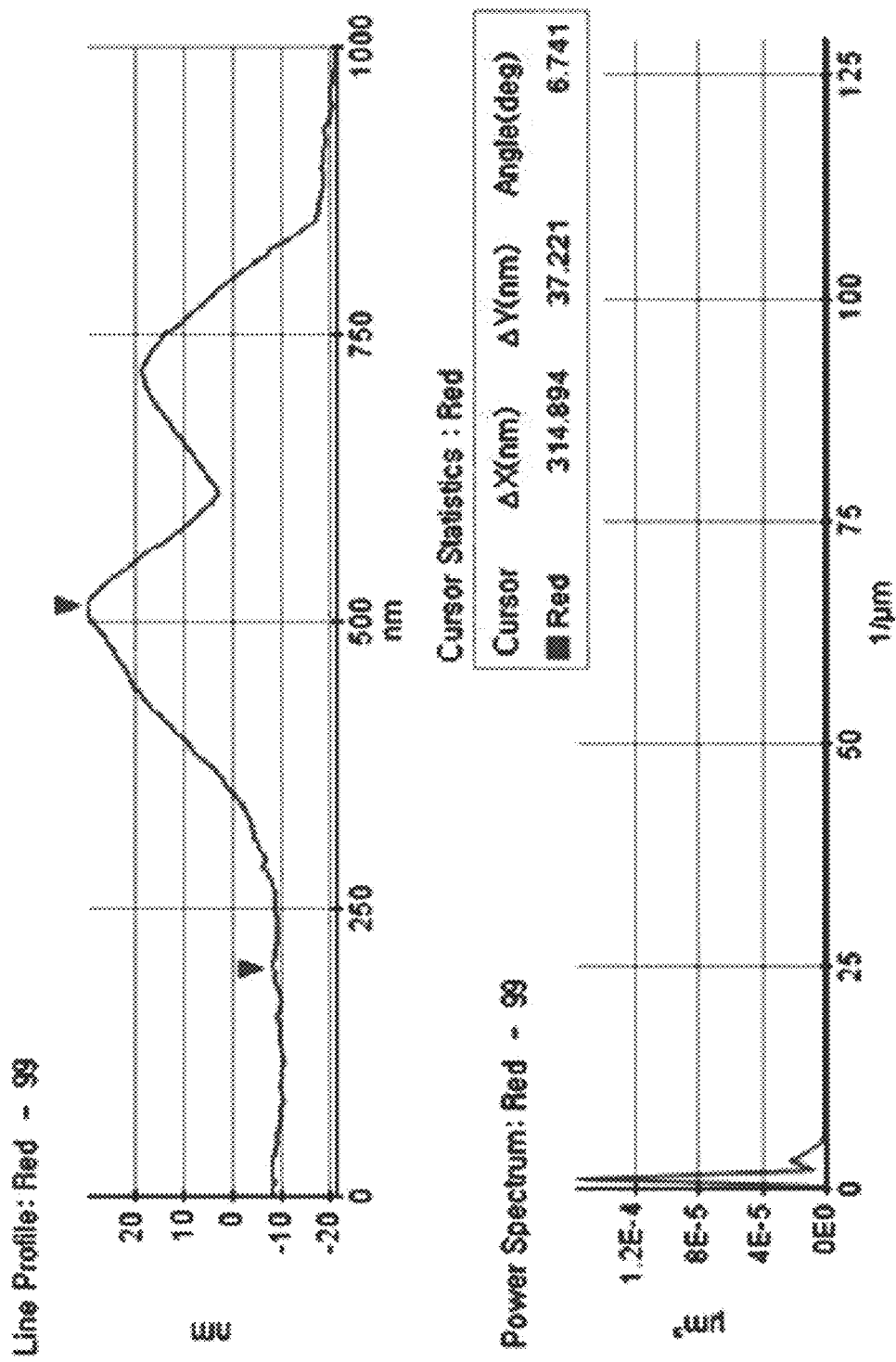

Hereinafter, examples of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document of the present disclosure, the term "connected to" or "coupled to" that is used to designate a connection or coupling of one element to another element includes both a case that an element is "directly connected or coupled to" another element and a case that an element is "electronically connected or coupled to" another element via still another element.

Through the whole document of the present disclosure, the term "on" that is used to designate a position of one element with respect to another element includes both a case that the one element is adjacent to the another element and a case that any other element exists between these two elements.

Through the whole document of the present disclosure, the term "comprises or includes" and/or "comprising or including" used in the document means that one or more other components, steps, operation and/or existence or addition of elements are not excluded in addition to the described components, steps, operation and/or elements unless context dictates otherwise. Through the whole document of the present disclosure, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document of the present disclosure, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document of the present disclosure, a phrase in the form "A and/or B" means "A or B, or A and B".

Through the whole document of the present disclosure, the term "self-adhesive film" refers to an adhesive film. When the film is attached to a substrate and then detached from the substrate, an adhesive is substantially not separated from the film, and when the attached film is detached from the substrate, a heating or UV irradiation process is not needed. Further, even after the film is attached to or detached from the substrate, the adhesion of the film is maintained.

Hereinafter, the present disclosure will be explained in detail with reference to embodiments, examples, and drawings. However, the present disclosure is not limited to the following embodiments and examples.

In a first aspect of the present disclosure, there is provided a transferring method of graphene including: attaching a self-adhesive film to one side of graphene on a first substrate; removing the self-adhesive film together with the graphene attached to the self-adhesive film from the first substrate; transferring the graphene attached to the self-adhesive film onto a second substrate; and removing the self-adhesive film from the graphene transferred onto the second substrate.

Since the self-adhesive film is attached to a surface to be attached, it is possible to protect the surface to be attached and also possible to easily detach the self-adhesive film from the surface to be attached without remaining an adhesive on the surface to be attached. Further, even after the self-adhesive film is attached and detached more than one time, the self-adhesive film retains adhesion. Therefore, the self-adhesive film has been mainly used as a material of a liquid crystal protective film or a glass protective film (for example, a window film) for a conventional cellular phone or smart phone. However, it has not yet been used to transfer a specific material such as graphene.

When the self-adhesive film is removed, it is not necessary to apply heat thereto. After the self-adhesive film is removed, the adhesive may substantially not remain on the graphene. However, the present disclosure may not be limited thereto.

FIG. 1 is a schematic diagram showing a transferring method of graphene in accordance with an embodiment of the present disclosure.

Referring to FIG. 1, a self-adhesive film 100 may be attached by a roll-to-roll method to one surface of graphene 200 formed on a metallic catalyst 300, and then, the metal catalyst may be removed by etching. Then, the graphene 200 attached to the self-adhesive film 100 may be transferred onto a second substrate 400.

In accordance with an embodiment of the present disclosure, instead of removing the metal catalyst by etching, the self-adhesive film may be removed from the metal catalyst together with the graphene attached to the self-adhesive film, but may not be limited thereto.

In accordance with an embodiment of the present disclosure, the self-adhesive film may be appropriately employed by those skilled in the art from those known in the art. By way of example, the self-adhesive film may include a film of which one surface is coated with a polyethylene vinyl acetate-based self-adhesive composition having a loss angle (tan δ) of from about 0.6 to about 1.0 measured at a temperature of about 60° C. and a frequency of about $10^{-2}$ Hz and a loss angle (tan δ) of from about 0.4 to about 0.7 measured at a temperature of about 60° C. and a frequency of about 10 Hz, but may not be limited thereto.

In accordance with an embodiment of the present disclosure, the self-adhesive film may be a self-adhesive composition including: an acrylic pressure-sensitive adhesive having an intrinsic viscosity of about 0.3 dl/g or more; a cross-linking agent; and a plasticizer compatible with the acrylic pressure-sensitive adhesive. The self-adhesive composition has a glass transition temperature of about −10° C. or less, and the self-adhesive composition may include a film of which one surface is coated with a self-adhesive composition having an initial 180 degree peel adhesion test value of about 5 oz/in or more, increased up to a final 180 degree peel adhesion test value of about 40 oz/in or less, and a turbidity test value of about 10% or less, but may not be limited thereto.

In accordance with an embodiment of the present disclosure, the self-adhesive film may include: an outermost layer including a first polymer film; and a second layer including a second polymer film having a storage elastic modulus of about $5.0 \times 10^6$ Pa or more at about 70° C., but may not be limited thereto.

By way of example, the outermost layer may include the first polymer film only or may include multiple layers including the first polymer film. The first polymer film of the outermost layer may include a film typically used as a liquid crystal protective film for a cellular phone, such as an acrylic resin film including polymethyl methacrylate (PMMA) or a polycarbonate resin film, but may not be limited thereto.

By way of example, the second polymer film may include a curable resin composition or a cured material of the curable resin composition, and the curable resin composition may include a curable resin component and selectively include other components such as a solvent, but may not be limited thereto. By way of example, the curable resin composition may include at least one reactive multifunctional acrylic compound selected from the group consisting of a multifunctional acrylic monomer, a multifunctional acrylic oligomer, and a multifunctional acrylic polymer, and/or a reaction product thereof, but may not be limited thereto.

In accordance with an embodiment of the present disclosure, the self-adhesive film may include an adhesive surface layer in which an adhesive is distributed from a surface to a first depth and a release surface layer in which a releasing agent is distributed from the opposite surface to the adhesive surface layer to a second depth, but may not be limited thereto. By way of example, the adhesive surface layer may have an adhesive strength of from about 5 g/inch to about 800 g/inch, but may not be limited thereto.

In accordance with an embodiment of the present disclosure, the self-adhesive film may include an adhesive coating film or a self-adhesive coextrusion film, but may not be limited thereto.

In accordance with an embodiment of the present disclosure, the self-adhesive film may include a member selected from the group consisting of polyethylene terephthalate (PET), cast polypropylene (CPP), low-density polyethylene (LDPE), linear low-density polyethylene (LLDPE), ethylene vinylactate, monoaxial oriented polypropylene (MOPP), polyvinyl chloride (PVC), polyurethane, acrylic resin, natural rubber, synthetic rubber, a glass fiber reinforcing agent, paper, metal foil, and combinations thereof, but may not be limited thereto.

By way of example, the synthetic rubber may include styrene-isoprene-styrene (SIS), styrene-ethylene-butadiene-styrene (SEBS), or styrene-butadiene-styrene (SBS), but may not be limited thereto.

By way of example, the self-adhesive film may further include rosin, a rosin derivative, terpene resin, or petroleum-based resin as a tackifier resin, but may not be limited thereto.

In accordance with an embodiment of the present disclosure, the self-adhesive film include an adhesive, and the adhesive may be appropriately selected from those known in the art, and may include, for example, an acrylic adhesive or a rubber-based adhesive, but may not be limited thereto.

By way of example, if the self-adhesive film is a self-adhesive coextrusion film, it may include a resin layer of one or more layers, but may not be limited thereto. By way of example, if the self-adhesive film includes a resin layer of three or more layers, the self-adhesive film may include a surface layer, a supporting layer, and an adhesive layer in sequence. In this case, the surface layer and the supporting layer may include unstretched polypropylene, polyethylene terephthalate, monoaxial oriented polypropylene (MOPP), polyvinyl chloride (PVC), polyethylene, polyurethane, acrylic resin, a glass fiber reinforcing agent, paper, or metal foil, but may not be limited thereto.

By way of example, if the self-adhesive film is a self-adhesive coextrusion film, the adhesive layer may include an acrylic-based adhesive, ethylene vinylactate, synthetic rubber, or natural rubber, but may not be limited thereto. By way of example, the surface layer, the supporting layer, and the adhesive layer may be arranged in a discontinuous or continuous manner.

By way of example, since an attractive force between the first substrate and the graphene on the first substrate is weaker than the adhesion of the self-adhesive film to the graphene, the graphene may be removed from the first substrate together with the self-adhesive film, but may not be limited thereto.

By way of example, since the adhesion of the self-adhesive film to the graphene is weaker than an attractive force between the graphene and the second substrate, the graphene may be transferred from the self-adhesive film onto the second substrate, but may not be limited thereto. By way of example, the attractive force may include a van der Waals' force, but may not be limited thereto.

In accordance with an embodiment of the present disclosure, transferring the graphene attached to the self-adhesive film onto a second substrate may be performed by a dry process, a wet process, or a roll-to-roll process, but may not be limited thereto.

By way of example, the graphene on the first substrate is not particularly limited, and may include graphene formed by exfoliating a graphite or graphene formed on a metal catalyst by a chemical vapor deposition method, but may not be limited thereto. The chemical vapor deposition may be employed without limitation from those typically used in the art for forming graphene, and may include, for example, thermal chemical vapor deposition, rapid thermal chemical vapor deposition (RTCVD), inductively coupled plasma-chemical vapor deposition (ICP-CVD), low pressure chemical vapor deposition (LPCVD), atmospheric pressure chemical vapor deposition (APCVD), metal organic chemical vapor deposition (MOCVD), or plasma-enhanced chemical vapor deposition (PECVD), but may not be limited thereto.

In accordance with an embodiment of the present disclosure, the graphene on the first substrate may be formed by supplying a reactant gas including a carbon source and heat onto the first substrate and growing graphene thereon, but may not be limited thereto.

In accordance with an embodiment of the present disclosure, the graphene on the first substrate may be formed by exfoliating a graphite, but may not be limited thereto. By way of example, the graphene may include graphene oxide formed by exfoliating a graphite by a well-known method for forming graphene oxide, or reduced graphene oxide formed by reducing the graphene oxide, but may not be limited thereto. By way of example, the graphene may include graphene oxide prepared by a preparation method including the Staudenmaier method, the Brodie method, the Hummer method, or an applied method thereof, or reduced graphene oxide (RGO) formed by reducing the graphene oxide, but may not be limited thereto.

In accordance with an embodiment of the present disclosure, the first substrate may further include a previously formed catalyst layer, but may not be limited thereto.

In accordance with an embodiment of the present disclosure, the catalyst layer may include a metal catalyst layer, and the first substrate or the catalyst layer may independently include one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, Ge, and combinations thereof, but may not be limited thereto.

By way of example, in the graphene attached to the self-adhesive film, the opposite surface to the surface attached to the self-adhesive film may include a catalyst derived from the catalyst layer, but may not be limited thereto.

In accordance with an embodiment of the present disclosure, the transferring method of graphene may further include: removing a catalyst remaining on the graphene by etching after the removing self-adhesive film together with the graphene attached to the self-adhesive film from the first substrate, but may not be limited thereto. While the graphene grown on the catalyst layer is removed from the catalyst layer by using the self-adhesive film, the catalyst may remain on the opposite surface to the surface of the graphene attached to the self-adhesive film. Therefore, an etching process may be performed in order to remove the catalyst from the graphene, but may not be limited thereto.

In accordance with an embodiment of the present disclosure, the graphene on the first substrate may be formed on another substrate and then transferred onto the first substrate, but may not be limited thereto.

In accordance with an embodiment of the present disclosure, the graphene may include graphene of about 1 or more layers, but may not be limited thereto. By way of example, the graphene may include graphene of from about 1 layer to about 100 layers, from about 1 layer to about 80 layers, from about 1 layer to about 60 layers, from about 1 layer to about 40 layers, from about 1 layer to about 20 layers, from about 1 layer to about 10 layers, from about 1 layer to about 5 layers, from about 2 layers to about 100 layers, from about 5 layers to about 100 layers, from about 10 layers to about 100 layers, from about 20 layers to about 100 layers, from about 50 layers to about 100 layers, or from about 70 layers to about 100 layers, but may not be limited thereto.

In accordance with an embodiment of the present disclosure, transferring the graphene attached to the self-adhesive film onto a second substrate may include transferring only the graphene onto the second substrate by bringing the graphene into contact with the second substrate, but may not be limited thereto.

In accordance with an embodiment of the present disclosure, the graphene attached to the self-adhesive film may be transferred onto graphene previously transferred onto the second substrate, but may not be limited thereto.

By way of example, the transfer may be performed by a dry process, a wet process, or a roll-to-roll process, but may not be limited thereto.

By way of example, graphene of two or more layers may be formed by repeatedly transferring the graphene attached to the self-adhesive film onto graphene previously transferred onto the second substrate, but may not be limited thereto.

In accordance with an embodiment of the present disclosure, the graphene previously transferred onto the second substrate may include graphene of about 1 or more layers, but may not be limited thereto. By way of example, the other graphene may include graphene of from about 1 layer to about 100 layers, from about 1 layer to about 80 layers, from about 1 layer to about 60 layers, from about 1 layer to about 40 layers, from about 1 layer to about 20 layers, from about 1 layer to about 10 layers, from about 1 layer to about 5 layers, from about 2 layers to about 100 layers, from about 5 layers to about 100 layers, from about 10 layers to about 100 layers, from about 20 layers to about 100 layers, from about 50 layers to about 100 layers, or from about 70 layers to about 100 layers, but may not be limited thereto.

In accordance with an embodiment of the present disclosure, transferring the graphene attached to the self-adhesive film onto the second substrate may be performed by a roll-to-roll method, but may not be limited thereto.

In accordance with an embodiment of the present disclosure, any one or both of the first substrate and the second substrate may have at least one characteristic of transparency, flexibility, and stretchability, but may not be limited thereto.

In accordance with an embodiment of the present disclosure, the transferring method of graphene may include: reusing the removed self-adhesive film, but may not be limited thereto. By way of example, the self-adhesive film maintains its adhesion even if the graphene is transferred one or more times, and, thus, the self-adhesive film removed from the graphene transferred onto the second substrate may be used to transfer another graphene one or more times, but may not be limited thereto.

In accordance with an embodiment of the present disclosure, the self-adhesive film may have a thickness of about 800 µm or less, but may not be limited thereto. By way of example, the self-adhesive film may have a thickness of from about 0.1 µm to about 800 µm, from about 1 µm to about 800 µm, from about 10 µm to about 800 µm, from about 50 µm to about 800 µm, from about 100 µm to about 800 µm, from about 300 µm to about 800 µm, from about 500 µm to about 800 µm, from about 0.1 µm to about 500 µm, from about 0.1 µm to about 300 µm, from about 0.1 µm to about 100 µm, from about 0.1 µm to about 50 µm, from about 0.1 µm to about 10 µm, or from about 0.1 µm to about 1 µm, but may not be limited thereto.

The graphene transferred by the transferring method of graphene in accordance with an embodiment of the present disclosure may be used to prepare a transparent electrode or various devices, but may not be limited thereto. By way of example, the graphene transferred by the transferring method of graphene of the present disclosure may be used to prepare electrodes of various electronic and electrical devices, such as a next-generation field effect transistor or a diode, required to have at least one of transparency, flexibility, and stretchability, to prepare a device channel, or to prepare a graphene transparent electrode for photoelectromagnetical application in a solar cell, a touch sensor, and their relevant flexible electronic technology field, but may not be limited thereto.

Hereinafter, the present disclosure will be explained in detail with reference to examples and drawings. However, the present disclosure is not limited thereto.

EXAMPLE

1. Analysis on Surface of Graphene Transferred using Self-adhesive Film

In the present example, a surface property of graphene transferred using a self-adhesive film was analyzed. In the present example, nanofine pure-oleophobic antifingerprint (SHV-E160S, SHV-E160K, and SHV-E160L for GALAXY NOTE LTE model) and MLU eye protection (SHV-E120L and SHV-E120S for GALAXY S2 HD LTE model) which are self-adhesive films for protection of liquid crystal in a smartphone were used as a self-adhesive film. In order to transfer a graphene, a self-adhesive film was attached onto graphene grown on a metal catalyst by a chemical vapor deposition method. Then, the self-adhesive film was removed from the metal catalyst, so that the graphene was removed from the metal catalyst. Thereafter, the metal catalyst remaining on the graphene was removed by using an etching solution. Herein, when a copper catalyst was used as the metal catalyst, an ammonium persulfate solution was used as the etching solution, and when a nickel catalyst was used as the metal catalyst, a $FeCl_3$ solution was used as the etching solution. In order to transfer the graphene attached to the self-adhesive film onto a PET film, the graphene attached to the self-adhesive film was brought into contact with the PET film by a roll-to-roll method at room temperature by using a laminator (LAMIART-320LSI, GMP) which is a two roll-based machine. Then, the self-adhesive film was arbitrarily removed from the graphene, so that the graphene was transferred onto the PET (polyethylene terephthalate) film by a van der Waals' force acting between the graphene and the PET film.

Figure 3A:
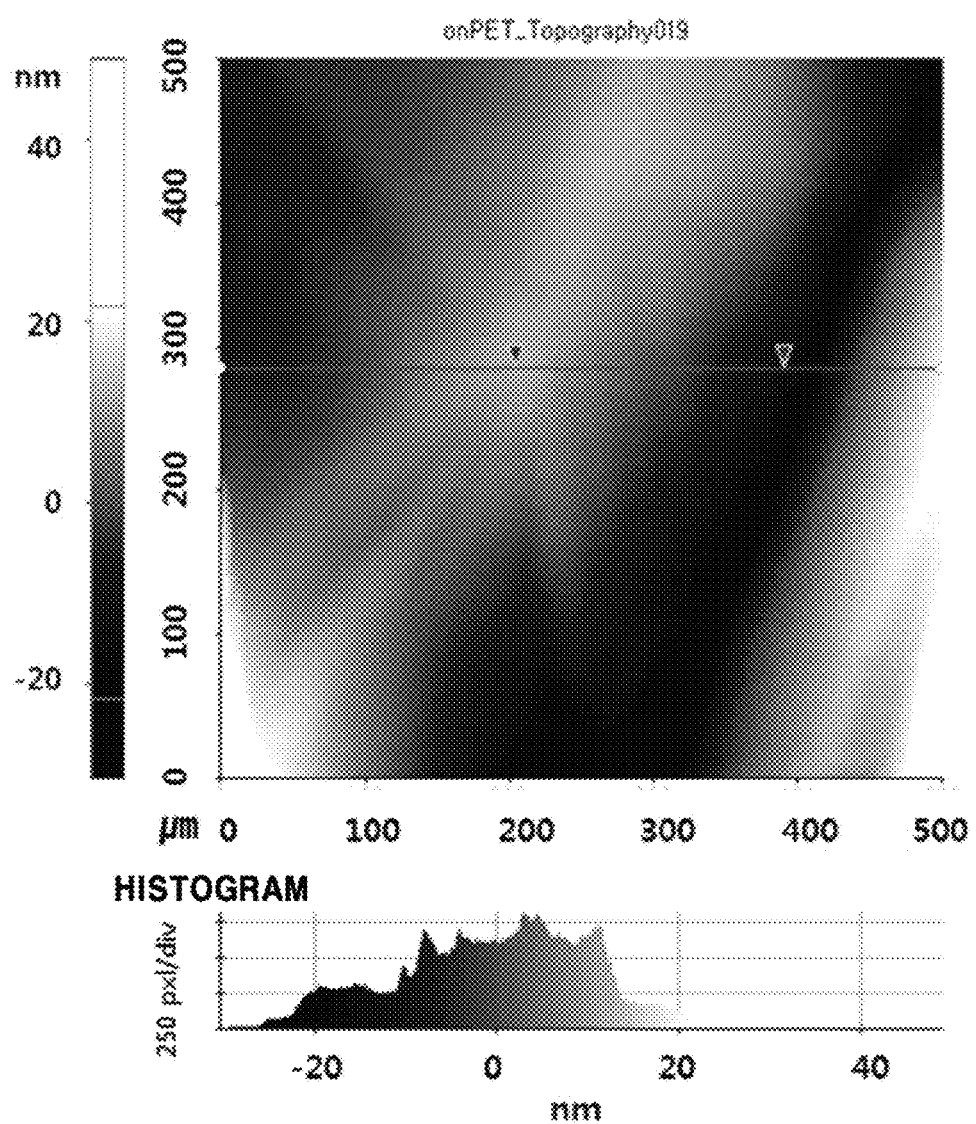
Figure 3C:
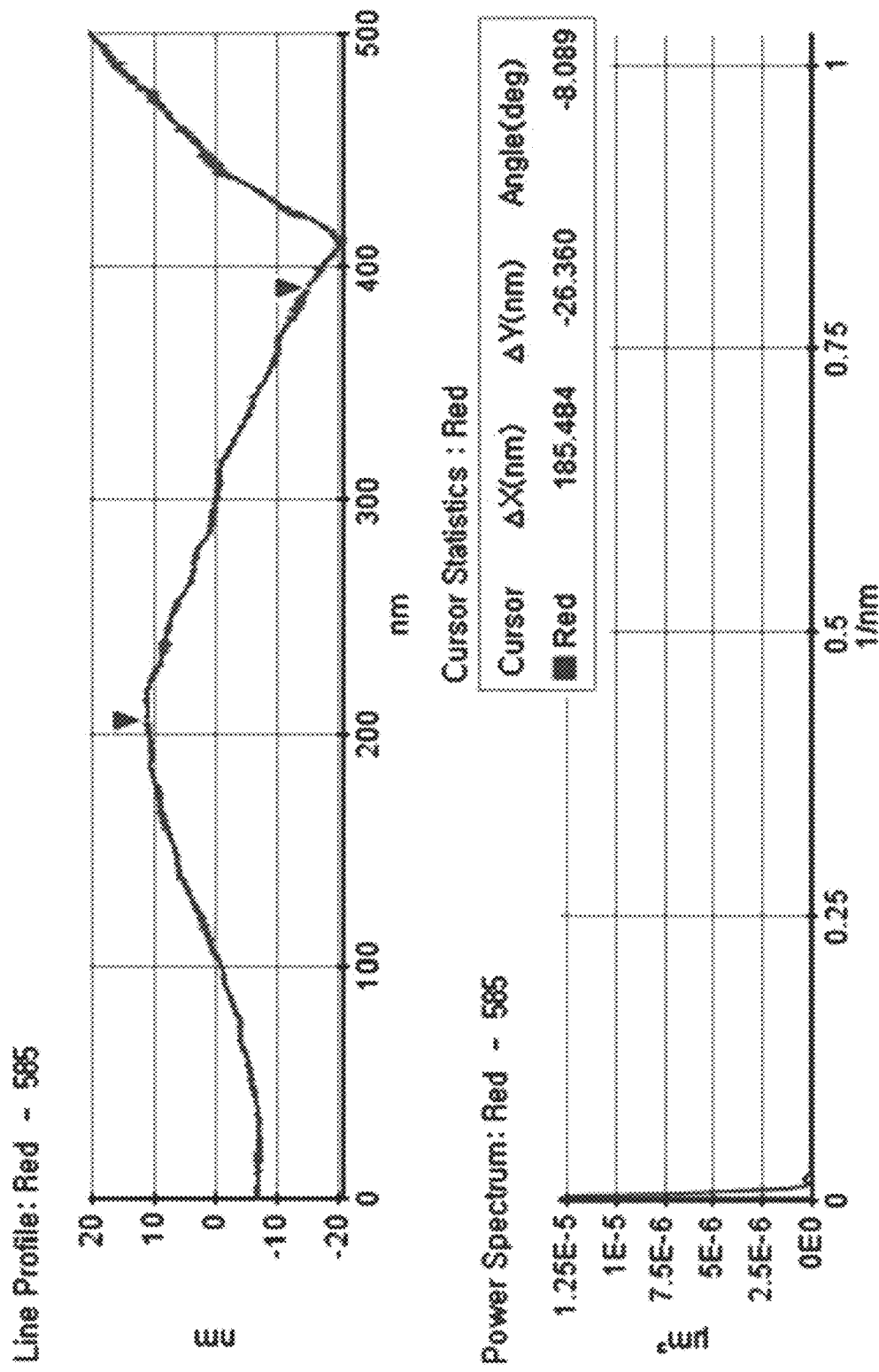
Figure 4A:
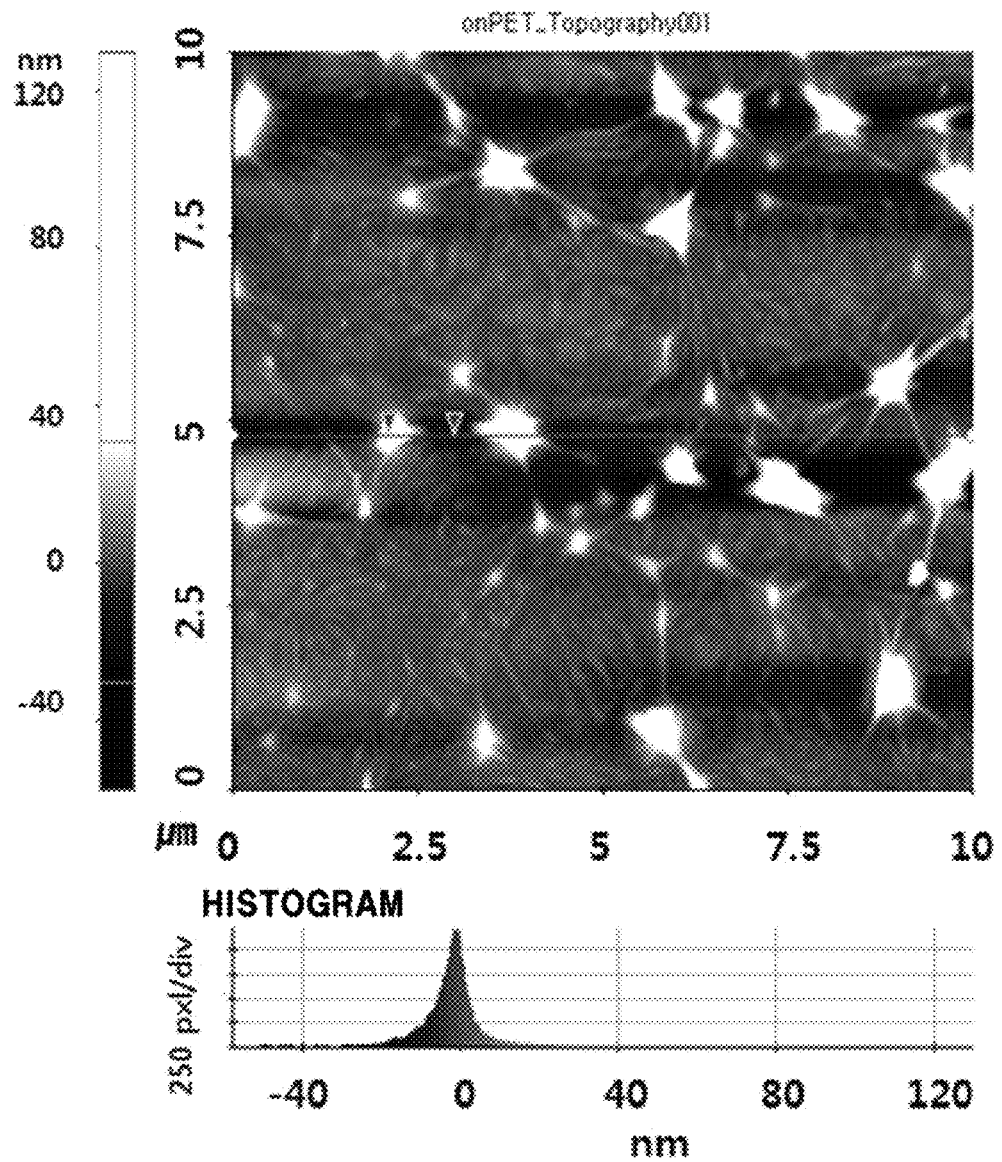
Figure 5A:
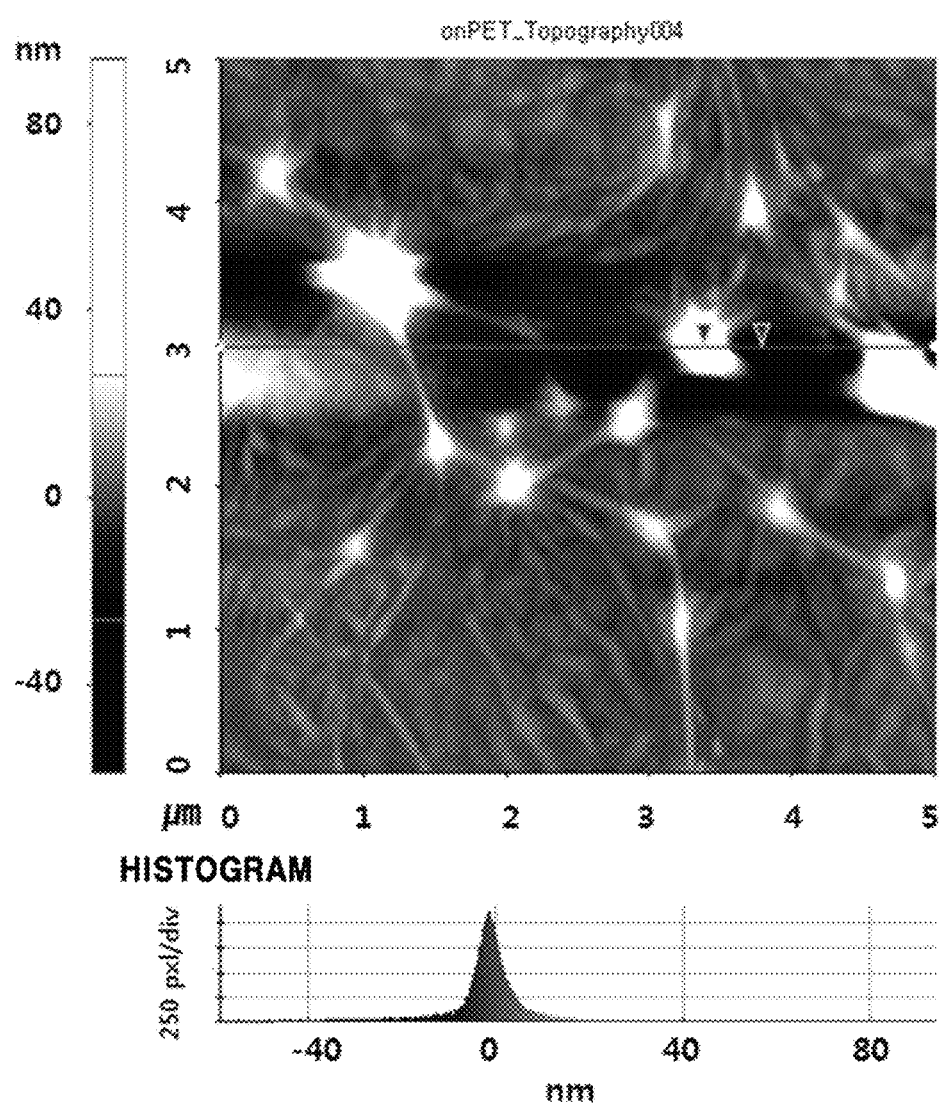
Figure 5C:
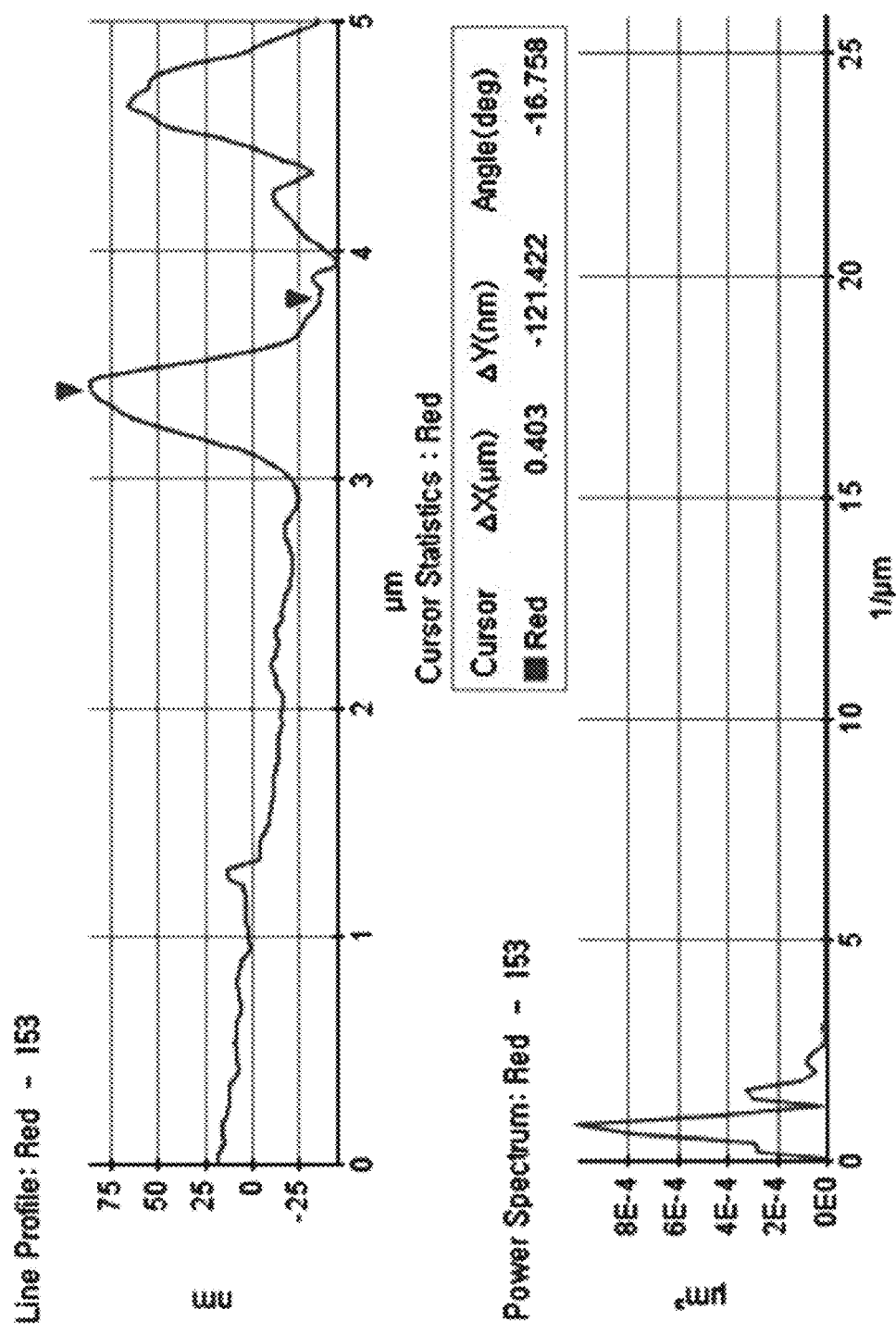

FIG. 2A, FIG. 2B and FIG. 2C show a result of analysis on a surface of graphene having an area of 1 µm×1 µm and transferred onto a PET substrate, FIG. 3A, FIG. 3B and FIG. 3C show a result of analysis on a surface of graphene having an area of 500 nm×500 nm and transferred onto a PET substrate, FIG. 4A, FIG. 4B and FIG. 4C show a result of analysis on a surface of graphene having an area of 10 nm×10 nm and transferred onto a PET substrate, and FIG. 5A, FIG. 5B and FIG. 5C show a result of analysis on a surface of graphene having an area of 5 nm×5 nm and transferred onto a PET substrate by using an atomic force microscope (AFM).

Generally, in the case of transferring graphene using a thermal-release tape, a polymer material derived from the thermal-release tape remains on a surface of the transferred graphene. However, according to the result of analysis on a surface of graphene transferred using a self-adhesive film in accordance with the present example by using an atomic force microscope, it was confirmed that a polymer material derived from the self-adhesive film rarely remains on a surface of the transferred graphene (see FIG. 2A to FIG. 54

2. Analysis on Graphene Property According to Multi-layer Transfer

In the present example, a transmittance and a sheet resistance of graphene transferred into one or more layers were measured and analyzed by using a UV-Vis spectrophotometer and a probe station.

Figure 6:
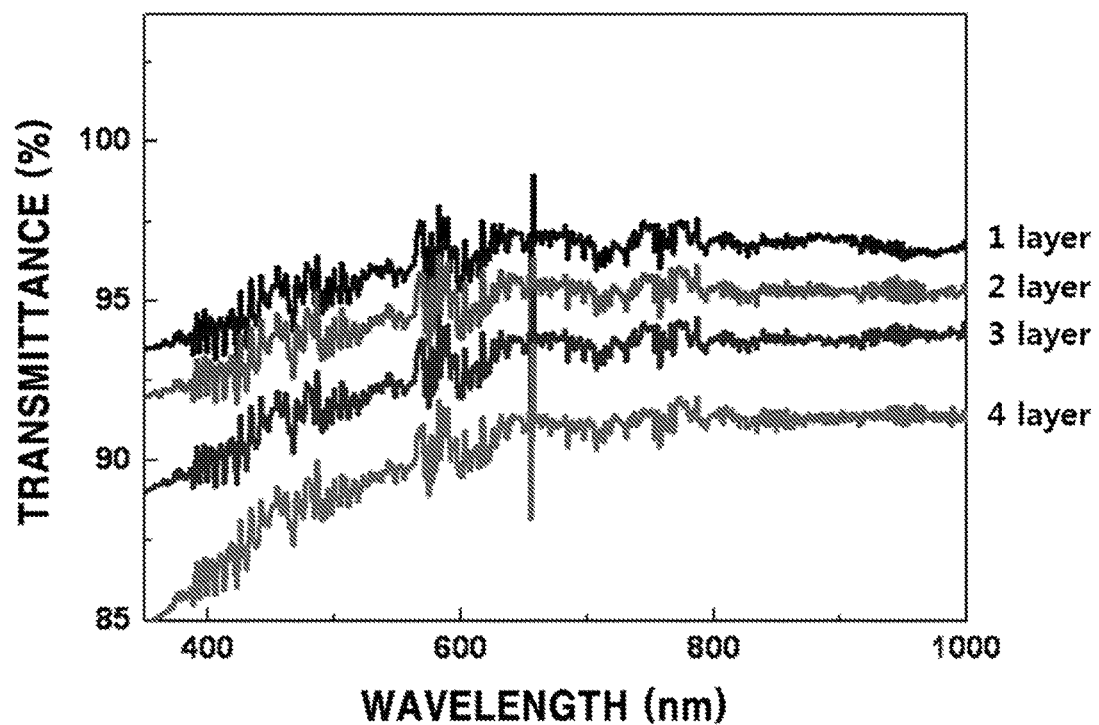
FIG. 6 is a graph showing a measured transmittance of multilayer graphene transferred by an example of the present disclosure.

When a transmittance was measured, a PET substrate was used as a reference substrate for comparison. After a light having a wavelength of from 300 nm to 700 nm was irradiated to the PET substrate onto which graphene was transferred using the self-adhesive film, a light emitted after absorption was detected by using a detector and calculated into a ratio, so that a transmittance was defined. FIG. 6 is a graph showing a measured transmittance of graphene transferred into one to four layers. Referring to FIG. 6, it was confirmed that as the number of layers of transferred graphene increases, the transmittance decreases.

Figure 7:
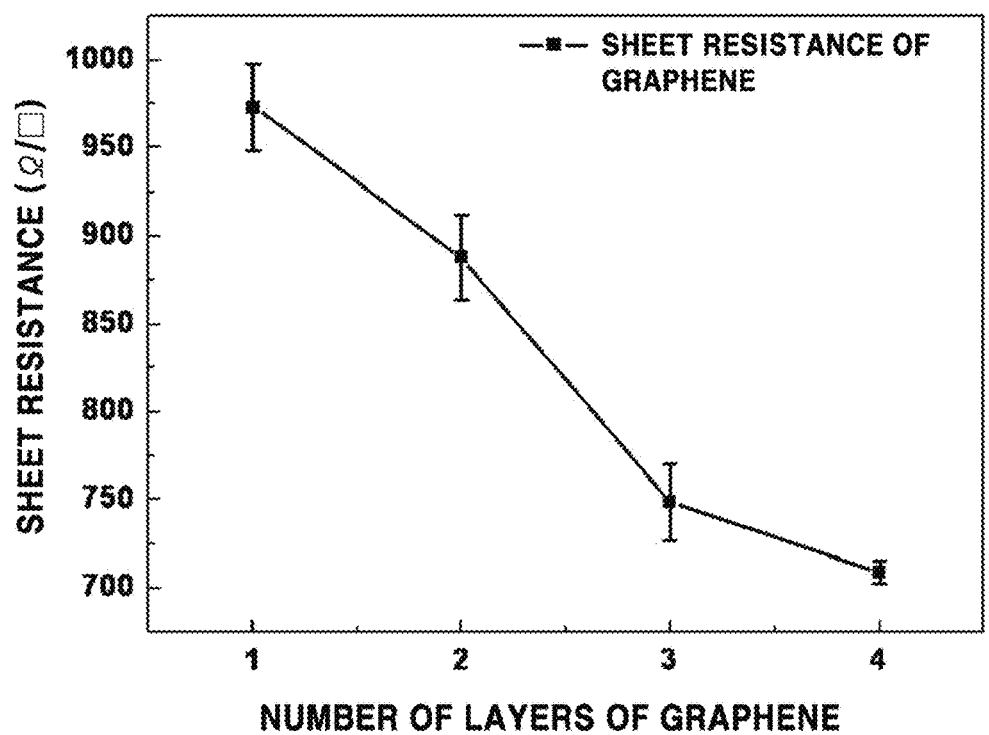
FIG. 7 is a graph showing a measured sheet resistance of multilayer graphene transferred by an example of the present disclosure.

The probe station used to measure a sheet resistance includes four tips. After the graphene transferred using the self-adhesive film was formed into a size of 1 cm×1 cm, a sheet resistance was measured by bringing the metal tips into contact with four edges, applying a certain current to two terminals, and measuring a voltage from the other two terminals (Van der Pauw method). The sheet resistance was calculated by the equation: resistance=(voltage/current). FIG. 7 is a graph showing a measured sheet resistance of graphene transferred into one to four layers. Referring to FIG. 7, it was confirmed that as the number of layers of transferred graphene increases, the sheet resistance decreases. That is, graphene transferred using a self-adhesive film may include multiple layers, and a value of a sheet resistance can be freely adjusted if necessary.

3. Analysis on Property of Transferred Graphene Depending on Number of Reuses of Self-adhesive Film In the present example, a property of graphene transferred one to four times by using a single self-adhesive film was analyzed.

Figure 8:
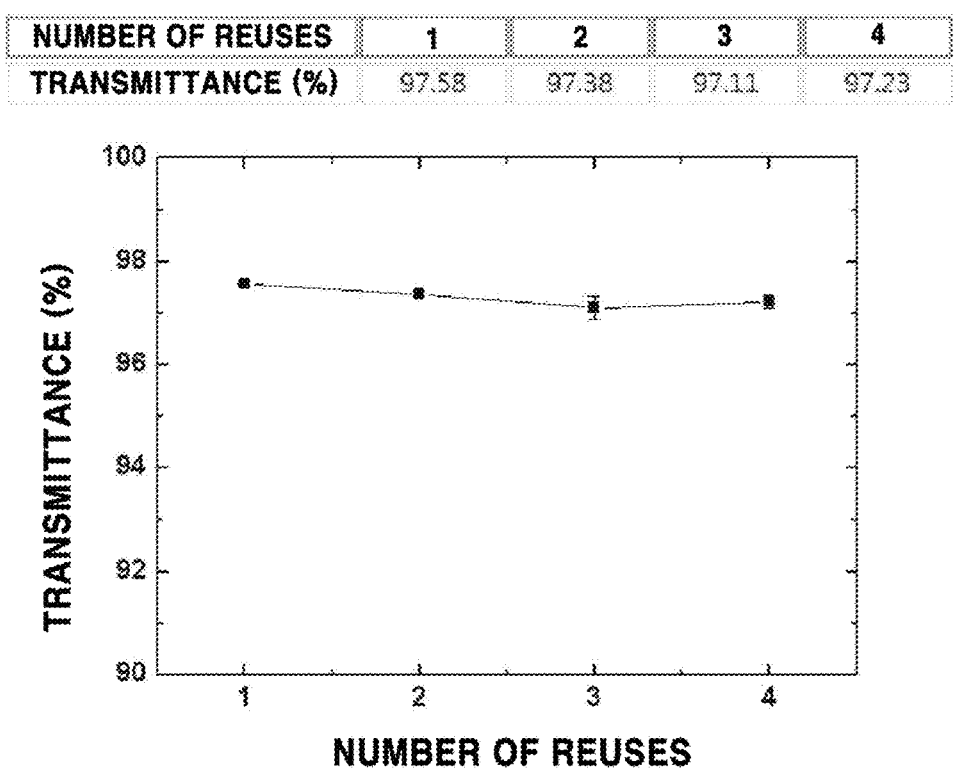
FIG. 8 is a result showing a property of graphene transferred by using a reused self-adhesive film in accordance with an example of the present disclosure.

FIG. 8 shows a measured transmittance of graphene transferred one to four times by using the same self-adhesive film. Referring to FIG. 8, even when graphene was transferred by using a reused self-adhesive film, the transmittance of the transferred graphene was rarely changed.

Figure 9:
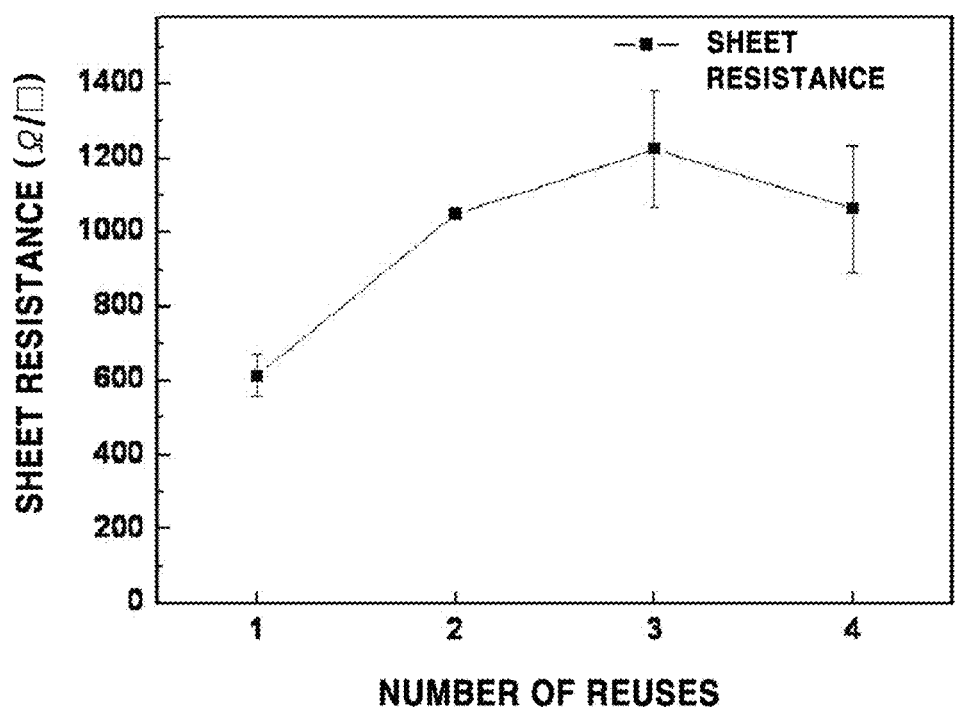
FIG. 9 is a result showing a property of graphene transferred by using a reused self-adhesive film in accordance with an example of the present disclosure.

FIG. 9 shows a measured sheet resistance of graphene transferred one to four times by using the same self-adhesive film. Referring to FIG. 9, even when graphene was transferred one or more times by using the same self-adhesive film, there was no big difference in sheet resistance of the transferred graphene. Therefore, it was confirmed that it is possible to transfer graphene multiple times by using the same self-adhesive film, and even in this case, a quality of the transferred graphene is maintained.

4. Analysis on Property of Graphene Device by Using Transferred Graphene

In the present example, graphene was transferred by using a self-adhesive film and then patterned, so that an electrode was prepared. A metal was deposited on a PET substrate by covering the PET substrate with a previously patterned metal shadow mask except a portion on which an electrode metal is desired to be deposited, so that an electrode was prepared. The electrode included chromium (Cr, 3 nm) and gold (Au, 30 nm), and was formed by melting and vaporizing a metal with heat by using a thermal evaporator and then depositing the metal on the substrate. Further, it was confirmed that a graphene channel device was working well on a flexible substrate by using ion-gel gating.

Figure 10:
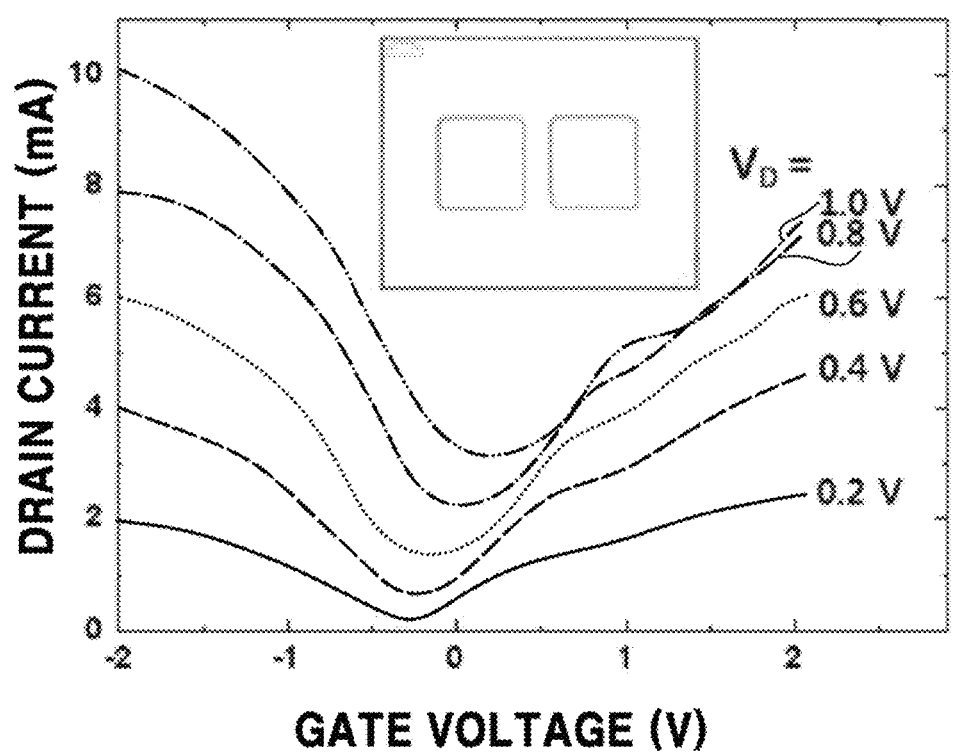
FIG. 10 is a result showing a property of a graphene device prepared in accordance with an example of the present disclosure.

Referring to the graph of FIG. 10, it was confirmed that when an applied drain voltage of a channel is changed, a property of a graphene channel device is also changed. To be specific, it was observed that as a drain voltage increases, an amount of current flowing through a channel increases. Therefore, it was confirmed that the graphene channel device including the graphene transferred by using the self-adhesive film is normally operated. Further, according to the calculated charge mobility in the table of FIG. 10, it was confirmed that the graphene channel device has an excellent property as compared with a conventional device using an ion-gel gating method.

Figure 11:
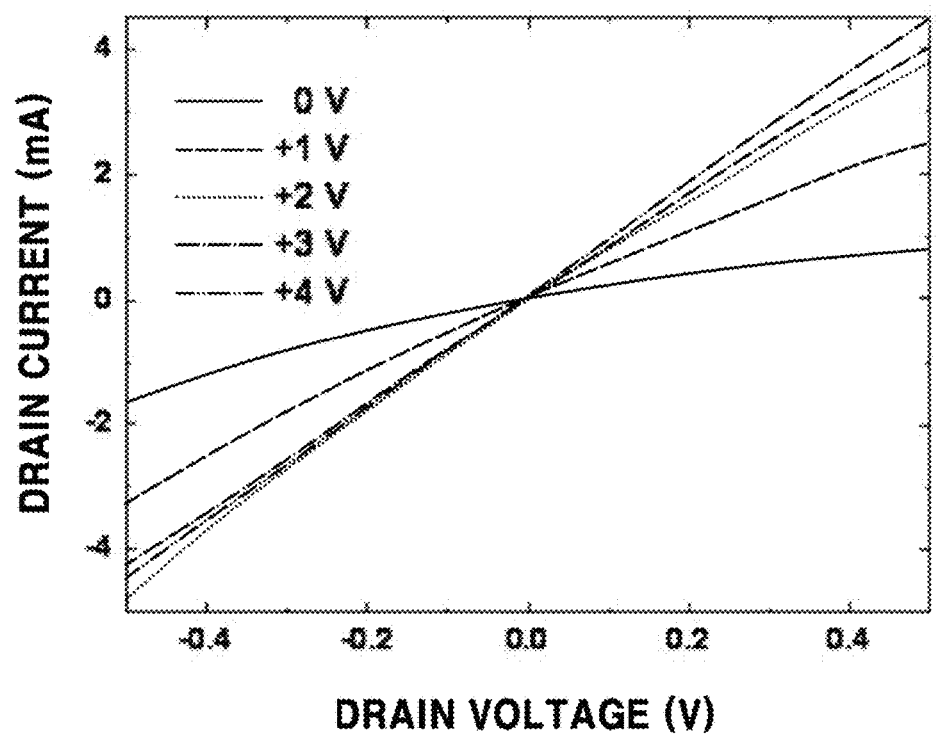
FIG. 11 is a result showing a property of a graphene device prepared in accordance with an example of the present disclosure

Furthermore, various resistances of a graphene channel depending on a gate voltage were measured and analyzed (FIG. 11). Referring to FIG. 11, it was observed that as a gate voltage increases, the resistance of the gate channel tends to decrease. Therefore, it was confirmed that the graphene channel device including the graphene transferred by using the self-adhesive film is normally operated.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A transferring method of graphene, comprising:
providing a polymer film having a self-adhesive coating;
attaching said self-adhesive coating to one side of graphene on a first substrate, wherein the attractive force between the graphene and said first substrate is weaker than the adhesion of the graphene to said self-adhesive coating, and wherein the graphene on said first substrate is formed on another substrate and then transferred onto said first substrate;
removing said polymer film and said self-adhesive coating together with the graphene attached to said self-adhesive coating from said first substrate, without application of heat and without etching;
transferring the graphene attached to said self-adhesive coating onto a second substrate; and
removing said polymer film having said self-adhesive coating, without application of heat, from the graphene transferred onto said second substrate.

2. The transferring method of graphene of claim 1, wherein transferring the graphene attached to the self-adhesive coating onto said second substrate is performed by a dry process, a wet process, or a roll-to-roll process.

3. The transferring method of graphene of claim 1, wherein the graphene on the first substrate is formed by supplying a reactant gas including a carbon source and heat onto the first substrate to grow graphene thereon.

4. The transferring method of graphene of claim 1, wherein the graphene on the first substrate is formed by exfoliating graphite.

5. The transferring method of graphene of claim 1, wherein the first substrate further includes a previously formed catalyst layer.

6. The transferring method of graphene of claim 5, further comprising:
removing any catalyst remaining on the graphene by etching, after the step of removing said polymer film and said self-adhesive coating together with the graphene attached to said self-adhesive coating, without application of heat and without etching, from said first substrate.

7. The transferring method of graphene of claim 5, wherein the first substrate or the catalyst layer independently includes one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, Ge, and combinations thereof.

8. The transferring method of graphene of claim 1, wherein the graphene is from one to 100 graphene layers thick.

9. The transferring method of graphene of claim 1, wherein the graphene attached to the self-adhesive coating is transferred onto graphene previously transferred onto the second substrate.

10. The transferring method of graphene of claim 9, wherein the graphene previously transferred onto the second substrate is from one to 100 graphene layers thick.

11. The transferring method of graphene of claim 1, wherein any one or both of the first substrate and the second substrate have at least one characteristic selected from the group consisting of transparency, flexibility, and stretchability.

12. The transferring method of graphene of claim 1, further comprising the step of reusing the removed polymer film having said self-adhesive coating.

13. The transferring method of graphene of claim 1, wherein said polymer film having said self-adhesive coating has a thickness of 800 μm or less.

14. The transferring method of graphene of claim 1, wherein said second substrate comprises polyethylene terephthalate (PET).

15. The transferring method of graphene of claim 14, wherein said second substrate is a PET film.

* * * * *